United States Patent [19]

Cremer

[11] 4,204,255
[45] May 20, 1980

[54] APPARATUS FOR ADJUSTING A VEHICLE SEAT

[75] Inventor: Heinz P. Cremer, Remscheid, Fed. Rep. of Germany

[73] Assignee: Keiper Automobiltechnik GmbH & Co KG, Remscheid, Fed. Rep. of Germany

[21] Appl. No.: 946,394

[22] Filed: Sep. 27, 1978

Related U.S. Application Data

[63] Continuation-in-part of Ser. No. 831,865, Sep. 9, 1977, abandoned.

[30] Foreign Application Priority Data

Sep. 9, 1976 [DE] Fed. Rep. of Germany ....... 2640528

[51] Int. Cl.² ........................ B60N 1/02; G06F 15/20
[52] U.S. Cl. ................. 364/425; 296/65 R; 364/715
[58] Field of Search ............... 364/424, 425, 706, 715; 296/65 R; 297/346; 318/466, 467

[56] References Cited

U.S. PATENT DOCUMENTS

| | | | |
|---|---|---|---|
| 2,983,545 | 5/1961 | Garvey et al. | 318/467 |
| 3,254,163 | 5/1966 | Wanlass | 200/6 R |
| 3,626,130 | 12/1971 | Siegal | 318/466 |
| 3,906,207 | 9/1975 | Rivere et al. | 364/425 |
| 3,979,058 | 9/1976 | Katz et al. | 364/706 |
| 4,037,092 | 7/1977 | Osborne et al. | 364/706 |

FOREIGN PATENT DOCUMENTS

| | | |
|---|---|---|
| 1116550 | 11/1961 | Fed. Rep. of Germany. |
| 1950471 | 11/1966 | Fed. Rep. of Germany. |
| 2019141 | 11/1973 | Fed. Rep. of Germany. |
| 2640528 | 3/1978 | Fed. Rep. of Germany. |
| 1268195 | 6/1961 | France. |

*Primary Examiner*—Felix D. Gruber
*Attorney, Agent, or Firm*—Wigman & Cohen

[57] ABSTRACT

An apparatus for adjusting the optimal seat position in a vehicle for a particular individual and for particular driving conditions is disclosed. A computer with a memory is programmed with specific vehicle parameters and at least one computer program and includes an entering device for entry into the computer of specific data about the individual user and the driving conditions. The computer supplies output data which may be used for manual adjustment of the seat position or which may be connected via a control device to servo-mechanisms which automatically optimally position the seat for the individual and the driving conditions.

6 Claims, 5 Drawing Figures

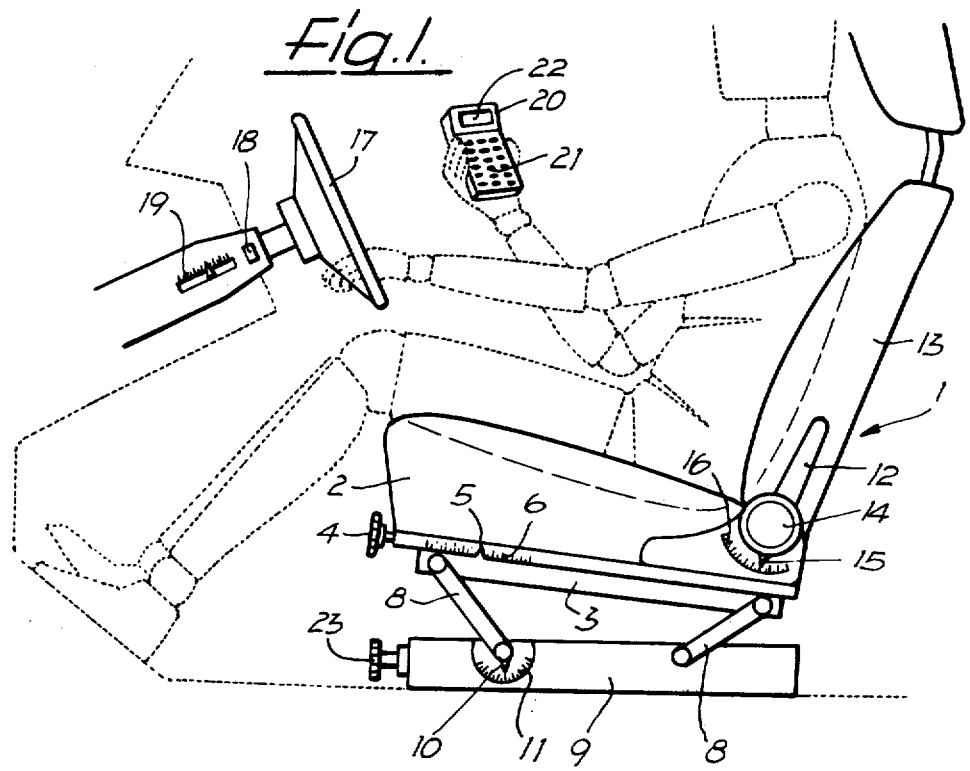
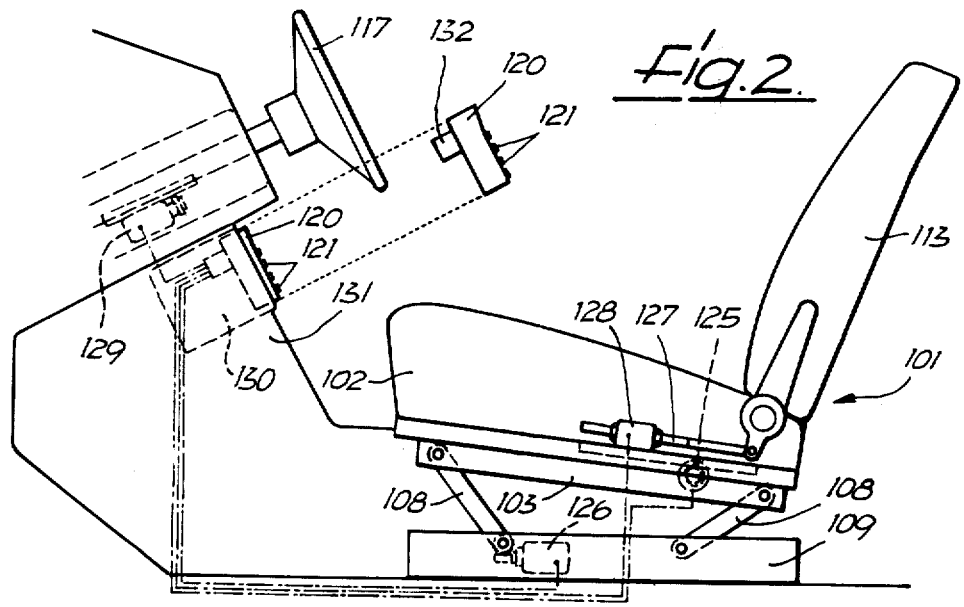

APPARATUS FOR ADJUSTING A VEHICLE SEAT

CROSS-REFERENCE TO RELATED APPLICATION

This is a continuation-in-part of application Ser. No. 831,865, filed Sept. 9, 1977, now abandoned.

BACKGROUND OF THE INVENTION

The present invention relates to apparatus for the adjustment of the position of a vehicle seat having adjustable parts for controlling the seat position, and specifically to an adjustable vehicle seat.

In vehicles, particulary in automobiles, it is common to install adjustable seats to permit the user to adjust the seat position to various positions. Generally, the seats are adjustable at least in a longitudinal direction and the inclination of the back rest is adjustable. Furthermore, it is conceivable that the countour of the seat upholstery could be adjustable, for example, to accomplish a proper support of the user's spine in the region of the lumbar vertebrae. The head rest is, in many cases, adjustable as well, in height and/or in its angular position. In addition, there are adjustment possibilities for the steering wheel, for example, its extension and inclination, as well as adjustments for the foot pedals. Premature fatigue of the user of the vehicle can be avoided only if the user is seated in a proper position and, insofar as concerns the driver, he must be enabled to safely reach all vehicle controls.

Apart from the fact that the vehicle user will usually not be aware of the optimal seat position, which, moreover, is different for varying driving conditions, for instance, city driving and long distance driving, it will be particularly unlikely that he will find the optimal position when he is presented with a wide variety of adjustment possibilities. In addition, optimal positioning is made more difficult, since the individual adjustment positions are influenced by each other. The consequence is that the seat position for many vehicle users is far removed from the optimum. This is further underscored by the fact that many vehicles are driven alternately by different persons and, therefore, many users will not undertake the effort to determine the correct seat position for themselves.

SUMMARY AND OBJECTS OF THE INVENTION

A primary object of the invention is, therefore, to provide an apparatus for the adjustment of the seat position for a person in a vehicle, which permits a vehicle user to readily determine his correct seat position. For an apparatus of the above-mentioned type, this object is accomplished according to the invention by a computer with a memory for the vehicle specific entry parameters and at least one computer program and including an entering device for specific data concerning the person and the conditions, and an indicating device and/or a connection for controlling adjustment devices with servomechanisms.

Vehicle specific entry parameters include, for example, data related to the vehicle cabin, the steering column, especially its position and its area of adjustment, the position and area of adjustment of the foot pedals, the size and position of the windshield, the field of vision to the front and the rear, the eye ellipse, the type of safety belt and the position of its anchoring points, as well as data for the seat, particularly the depth of the seating, pitch of the springs, the cushion contour the adjustment possibilities, and the adjustment areas. Specific data for a person includes, for instance, information about the position of the joints, the body contour, anthropometrically advantageous angles and areas, as well as the height of the eyes. On the basis of this data, the computer calculates the most favorable position of the seat adjustment device for possible driving conditions, for example, for long distance driving, for city driving, for fast driving on a mountainous and twisting road, for lying or resting, and for entering and leaving the vehicle, and then displays the calculated data on a indicator to the user, who can then proceed to manually adjust the positioning devices in the proper manner. The data of the computer can also be transferred to a control mechanism, which controls servomechanisms for the operation of the positioning devices. The data supplied by the computer includes, for example, data about the longitudinal position of the seat, height of the seat surface and inclination, as well as inclination of the back rest. The data may also include adjustment instructions for the length and width of the seat, position of the head rest, and position of the hip support. Furthermore, it would be possible to calculate the adjustment data for the length and inclination of the steering column, for the pedals, the shift and operating elements, and for the mirror.

In a preferred embodiment, an entering device is provided with codes. The user must, under these circumstances, punch-in the code specific to his person, and, if the computer is equipped to handle the calculation of different optimal seat positions for varying driving conditions, a code specific to the prevailing circumstances. This is possible if the computer was programmed at an earlier stage with the specific personal data. It is, of course, not only possible to compute the optimal seat position for the above-mentioned different situations, but, with the appropriate programming, the computer can, for example, also calculate an adjustment which, after a long drive, would change the position of the body in such a way that the muscle tone is stimulated.

The optimal seat position is that seat position in which the angles of the ankle, knees, hips, torso and the arms lie within a predetermined or most favorable angular range. If the seat adjustment possibilities do not allow this angular range, the aforesaid angles should deviate as little as possible from this predetermined range.

The most favorable angular range has been determined by medical research. However, this most favorable angular range is also dependent on the basic structure of the automobile and the automobile seat. For example, the most favorable knee angle in a seat of a truck is different than that, for example, in the seat of a private automobile. However, even in different private automobiles the most favorable seat position can vary, but the basic seat position is at least similar in all private automobiles, so that the differences in the most favorable positions are not particularly great. The basis of the most favorable seat position is assumed for the purposes herein to be within the following angle ranges, which may strictly be taken only for a specific vehicle with a specific seat, but may also be used for other vehicles:

Ankle angle ±4°;
Knee angle 100° to 140°;
Hip angle 90° to 120°;

Torso angle 16° to 18°;
Arm angle 70° to 170°.

Accordingly, the seat position is optimal when the above angles lie within the stated angular ranges or deviate therefrom as little as possible.

Experts who have investigated the position of a person while sitting have indicated ranges for the position in which the person sits most comfortably and with the least fatigue. From this experience, it has been determined that the person who has sat incorrectly for years initially finds a proper body position uncomfortable. However, after a short accustomization period, the person recognizes the optimal seat position as the more comfortable.

It is advantageous to provide for manual correction for all settings if the control of the adjustment device is to be automatic under normal conditions. Even if a control for each individual position has been provided, a mechanical coupling of two or more functions can be conceived, if such a coupling is advantageous for an optimal setting of the seat. The inventive apparatus can be built into a vehicle so it can be operated independently, including the computer. The latter form of construction offers the advantage, that, if the vehicle-specific data for different vehicles has been entered, stored and can, for instance, be recalled via a code, it can be used for different vehicles.

BRIEF DESCRIPTION OF THE DRAWINGS

In the following, the invention is shown schematically for two embodiments, and explained in detail. In the drawings:

FIG. 1 is a side elevation view of a first embodiment of the invention shown in connection with manually operated adjustment devices on a vehicle seat and on the steering column of the vehicle;

FIG. 2 is a side elevation view of a second embodiment of the invention, which fits into a mounting on a vehicle, and shown in connection with motor-driven adjustment devices for a vehicle seat and a steering column;

DETAILED DESCRIPTION OF A PREFERRED EMBODIMENT

Figure 3:
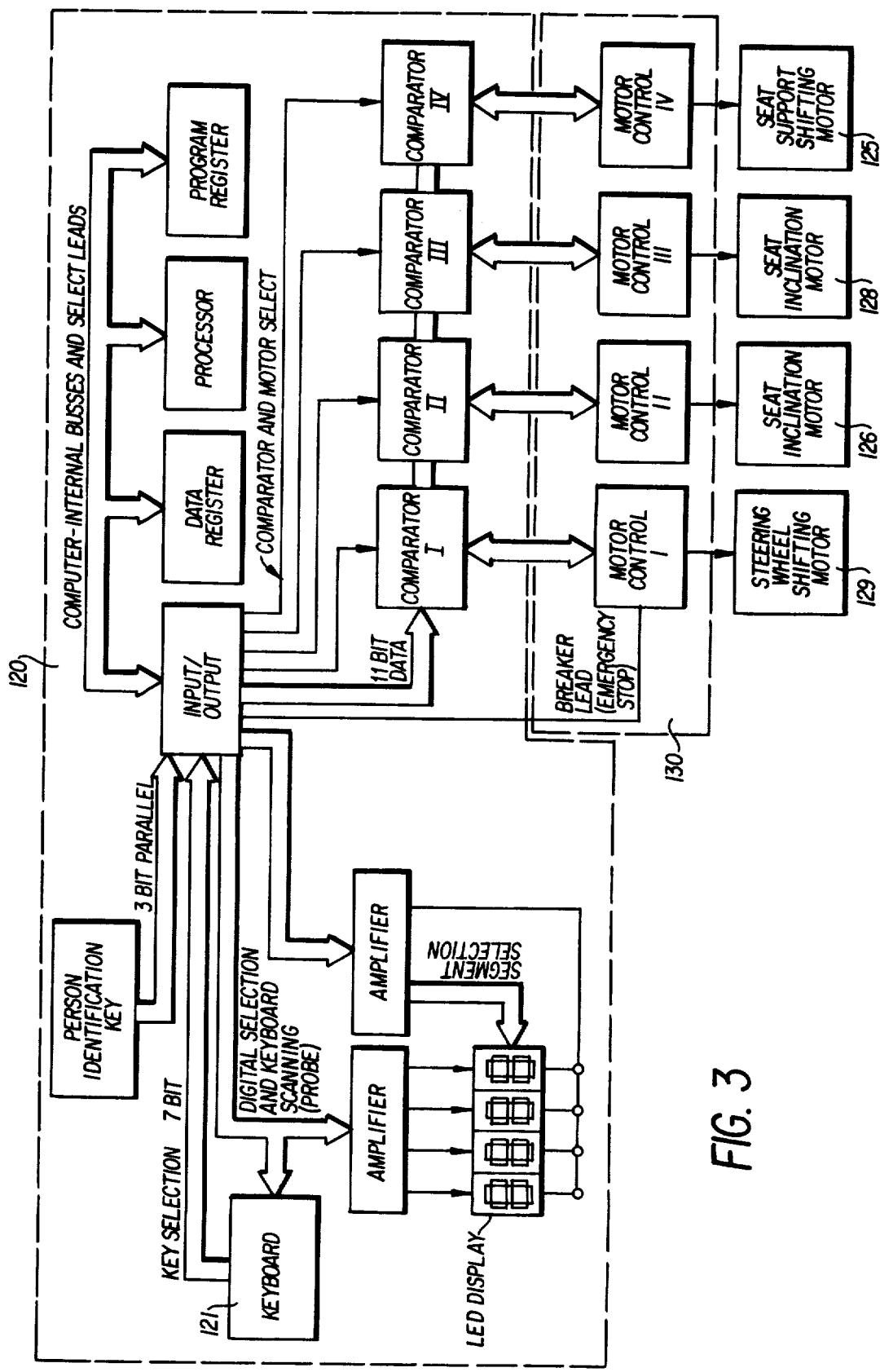
FIG. 3 is a block circuit diagram illustrating the various components and connection of the computer control system for the vehicle seat adjustment according to the present invention.

Referring now to the drawings, a seat for the driver of a vehicle, designed generally by reference numeral 1, has a seat section 2, which can be adjusted in a longitudinal direction relative to the vehicle on a subframe 3. The longitudinal adjustment is accomplished by the turning of a handwheel 4 positioned on the front of the seat section 2, via a transmission not shown in the drawing. The adjusted longitudinal position can be read-off by means of a pointer 5, which is rigidly attached to the subframe 3, and a scale 6 on the seat section 2. The subframe 3 is, in the usual way, connected to a base 9 via guides 8 and the base 9 is secured to the bottom plate of the vehicle. By means of a handwheel 23, which is positioned at the front of the base, and a transmission, not shown, the guides 8 can be pivoted, whereby the height as well as the inclination of the seat section 2 can be adjusted. A pointer 10 on the pivot axis of one of the guides 8 and a corresponding scale 11 permit the reading of the angle position of the front guide 8. To both sides of the seat section 2 a jointed fitting 12 is provided, which provides adjustability for the back rest 13 and permits securing the back rest in a selected position in connection with the seat section 2. The adjustment of inclination is accomplished by a handwheel 14 on one of the jointed fittings 12. A pointer 15 and a scale 16, the latter provided on the part of the jointed fitting attached to the seat section 2, make it possible to read the degree of inclination of the back rest. The steering column 17 can be adjusted within a certain range in a longitudinal direction of the column after a locking mechanism 18 has been released. The degree to which the steering column has been extended can be read-off by means of a scale 19 and a pointer which is attached to the steering column.

A device, designated generally by reference numeral 20, for the adjustment of the seat position is shown in the FIG. 1 embodiment as a portable instrument, however, it could also be built into the vehicle. The device 20 contains a computer with a memory for the vehicle-specific data, especially the data concerning the vehicle cabin, the position and adjustment area of the steering column, the position and size of the windshield, the size of the field of view toward the front and the back, the eye ellipse, the type of safety belt and the position of the anchoring points, data about the seat 1, specifically, the depth of the seating, the pitch of the springs, the adjustment possibilities, the adjustment area and the cushion contour, as well as for the specific data about the person as, for example, the position of the joints, the body contour, the anthropometrically favorable angles and areas, and the height of the eyes and, furthermore, for computer programs for different situations, for instance, a long driving period, city driving, fast driving on mountainous and twisting roads and the like. With the pushbutton keyboard 21, the user enters into the computer a personal code as well as a code for the driving conditions. On a display device 22, sequentially shown on call, there is displayed the data which must be set using the scales 6, 11, 16, and 19 in order to achieve the optimal seat and steering column positions for the corresponding conditions. Since the computer takes the cross influences of the different settings into account, it makes no difference in which sequence the user of the seat makes the individual adjustments.

In the embodiment shown in FIG. 2, a seat, designated generally by reference numeral 101, has the same adjustment possibilities as the seat of FIG. 1. However, the steering wheel 117 is, as in the embodiment shown in FIG. 1, adjustable in the longitudinal direction of the steering column. The seat section 102 is arranged for longitudinal adjustment on a subframe 103. The longitudinal movement and the securing of the seat section 102, when the proper position is reached, is accomplished by an electric motor 125. For the purpose of adjusting the height and inclination of the seat section 102, the subframe is carried, as in the embodiment of FIG. 1, by guides 108 the lower sections of which are connected pivotally with a base 109. An electric motor 126, which is situated in the base 109, drives, on an axis of rotation, a shaft which is torsionally, rigidly connected with the front guide 108. The back rest 113 is attached to the seat section 102 with two jointed fittings as in FIG. 1. The section of the fitting which is attached to the back rest is elongated past the swivel axis in a downward direction. Pivotally secured to the free end of this elongation is a rod 127 which is located to the side of the seat section 102. The forward end of this rod has a thread which is threaded into an axially immovable but rotatable nut under the seat section 102, which nut is rotatably driven by an electric motor 128. A further electric motor 129 is employed to adjust the steering wheel 117 in the longitudinal direction to the steering column.

The connecting wires of all electric motors 125, 126, 128, 129 are led to a motor control device 130, which is mounted, in this embodiment, in a console 131 on the driveshaft tunnel beneath the dashboard. The console 131 also has a mounting into which a device, designated by reference numeral 120, for the adjustment of the seat and steering column is loosely fitted, so that it may be removed. A plug 132 is provided on the back of the device 120 which establishes the necessary connection with the control device 130 when the device 120 is placed into the mounting. The device 120 is designed in the same manner as the device 20, i.e., it contains a computer with memories for the vehicle-specific data, the specific data for a person, and several different programs. With the pushbutton keyboard 121 the personal code and the situation code is entered. The resulting data are fed on demand sequentially, into the control device 130, which, if need be, will set the electric motors in motion and maintain them in operation until the computer determines that the optimal seat position on the basis of the entered data has been attained.

FIG. 3 illustrates, in simplified block diagram form, the components of the FIG. 2 embodiment of the invention including the computer 120, the keyboard 121, the motor control device 130, and the adjustment motors 125, 126, 128, 129 for the automatic positioning of the seat 101 and the steering wheel 117. It will be understood that the device 20 shown in FIG. 1 includes components essentially identical to those of the device 120 of FIG. 3, excluding the comparators I–IV and the input circuits thereto which are only necessary for the shifting motor control of the completely automatic control system of FIG. 2.

Figure 4:
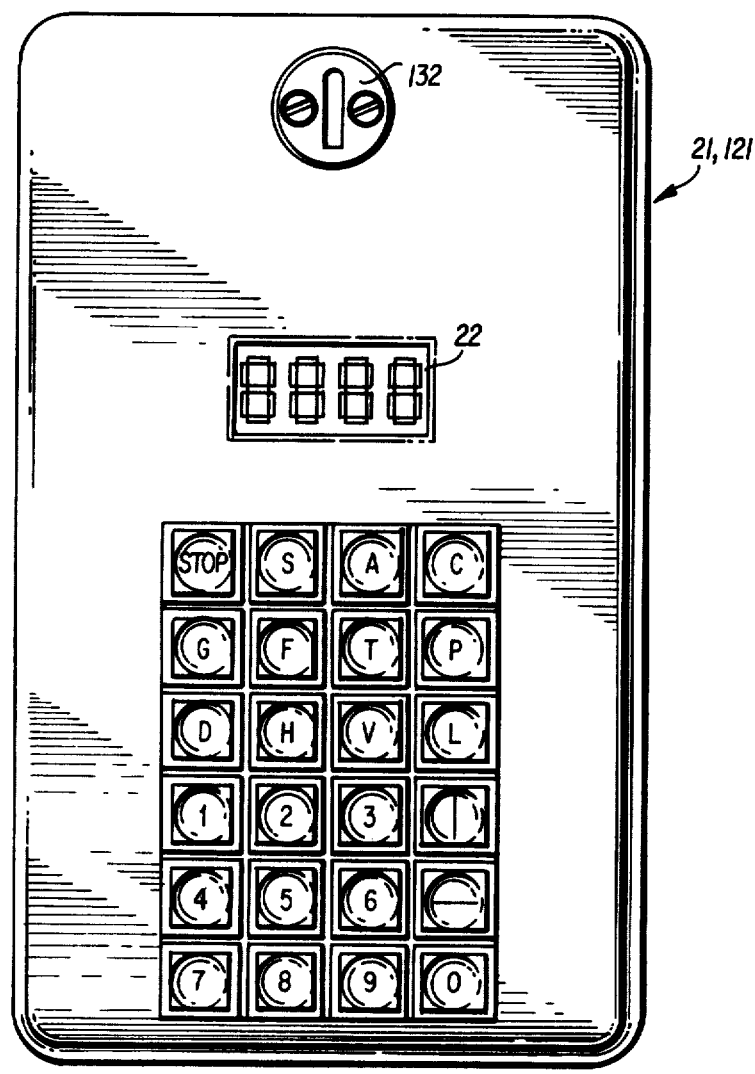
FIG. 4 is a front view of the control device showing the display and the person identification key.

FIG. 4 illustrates the keyboard 21 or 121 for the respective device 20 or 120. The keyboard includes the display 22, which may also be provided in the embodiment of FIG. 2, and a person identification lock 132 for receiving a person identification key (not shown) which assures that the processor only manipulates the data of the person who has inserted his particular identification key into the lock.

The individual keys of the keyboard have the following meaning and function:

| | | |
|---|---|---|
| | Stop Key | The stop key is used with the FIG. 2 embodiment as an emergency stop key to interrupt signals to all the shifting motors 125, 126, 128, 129. |
| | Situation Key | The situation key is used for selection of the particular driving situation in combination with one of the numeric keys, thus, for example, <br> S1 - entering and leaving the vehicle <br> S2 - resting position <br> S3 - lying position <br> S4 - normal travel <br> S5 - city travel <br> S6 - curved stretch <br> S7 - intermittent shifting |
| A - | Display/ Change Key | The display/change key is used for activating the display and for changing the stored values, for example, the stored data for a particular person. |
| C - | Clear Key | The clear key clears the keyboard. |
| F - | Factor Key | The factor key is used for changing the shift magnitudes effected by the shifting motors, for example, an input of the factor 0.85 for seat back inclination will cause the respective shifting motor to set the inclination not at the calculated angle, i.e., 30°, but at an angle of 25.5°. A factor can be entered for each of the shifting motors. |
| T - | Time Input Key | The time input key is used for inserting a time input to effect a change of position after the time period inserted. |
| P - | Person Key | The person key is used to insert the data to be stored for the various persons. |
| D - | Steering Wheel Shifting Motor Key | |
| V - | Seat Inclination Shifting Motor Key | The keys D, V, H and L are used to insert values for the respective shifting motor. |
| H - | Seat Back Inclination Motor Key | |
| L - | Seat Support Shifting Motor Key | |
| G - | Seat and Seat Back Shifting Motor Key | The G key is used for simultaneous shifting of the V and H motors. |
| + | Plus Key | The plus key is used with one of the keys D, H, V, L or G for value changing positively. |
| − | Minus Key | The minus key is used in the same way as the plus key for value changing negatively. |

All data is inserted into the keyboard. The vehicle data for a particular vehicle model is constant and the personal data, i.e., the data for a particular person, is dependent on the various dimensions of such person. Both vehicle and personal data are stored in the computer memory. The personal data includes, for example, the length of the upper arm, lower arm, thigh, lower leg or knee height, the eye level and head height. With the aid of a calculating program and on the basis of the personal data measurements, four personal distinguishing values are calculated and placed into the computer in the form of three-digit numbers in each of the shifting motor keys D, V, H, and L. For each of the driving situations S1–S7, there is a corresponding optimum value of D, V, H, and L for each person for whom the system has been programmed, which optimum values may be determined experimentally or empirically.

The factors which are inserted by means of the factor key F concern corrective values that are to be added to or subtracted from the personal data values and are experience or test values in the various situations and with which the computer computations can be advantageously corrected. For example, the factors for situation S7, i.e., adjustment of the seat out of the position in S4 after a certain period and resetting the same into the position of situation S4 after a like time period, can either be determined on the basis of experimentally proven values or on the basis of an incidental optimization which is supplementally computed by a calculator during the determination of the optimal seat position.

Figure 5:
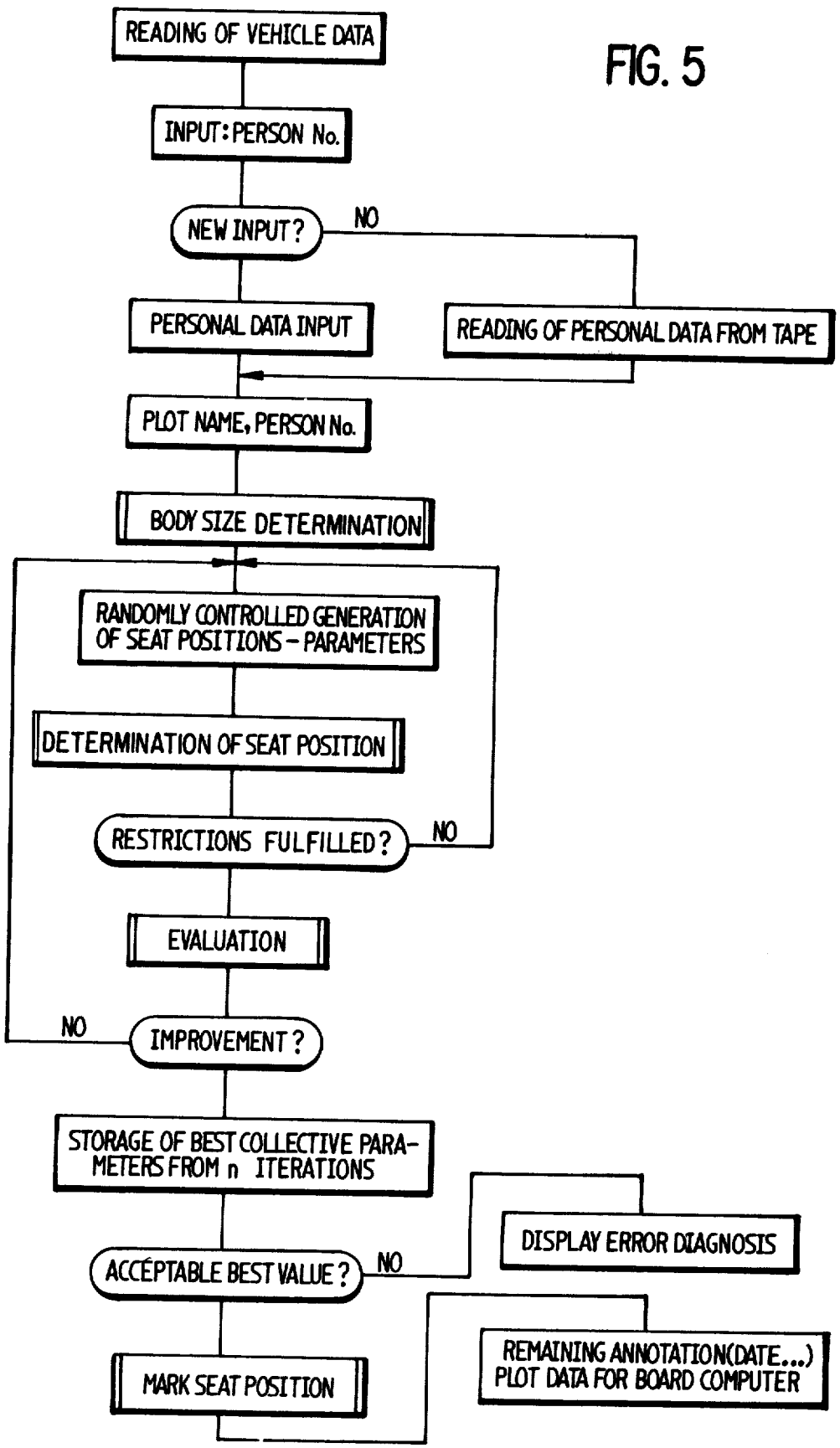
FIG. 5 is a flow diagram for determining the optimal seat position.

FIG. 5 illustrates a flow diagram useful for determining the optimal seat position for a given person. The computer first reads the vehicle specific data for the automobile in which the computer is operating because the optimal seat position must be referenced to each vehicle model. This data may be found in a catalog of vehicle information.

Because the optimal seat position takes the individual body dimensions into consideration, these dimensions must be inputted into the computer as the next step in the program. If these values are already in the computer's memory, they are read therefrom by the computer. In other words, if the program recognizes the person number from the previous step to be one for which personal data is already in its memory, the computer merely reads that information out of its memory. However, if the answer to the NEW INPUT? query is yes, the next step is to input the personal data. Based on the values of average persons (VDI Guideline 2780, German Industrial Standard 00 33 408, SAE documents) the personal data are used to determine other body dimensions and joint locations of the person.

Thus, based on measured personal data and data for standard persons, the computer determines the distance between the sole of the operator's shoe and the knee joint, between the knee joint and the hip joint, between the hip joint and the trunk joint, between the trunk joint and the shoulder joint, between the shoulder joint and the elbow joint, between the elbow joint and the center of a clenched hand, between the shoulder joint and the pivot point of the neck, and between this pivot point and the eye point.

Next, the random generator supplies the computer with random values for the parameters which define the seat position. Based on these values, the computer determines the body angles, namely, the angle of the foot joint, the knee joint, the hip joint, and all other joints described above. The result of these determinations is checked to see whether the following conditions are fulfilled:

Do the body angles lie in the average ranges as determined by physicians?

Has the adjustment range of the seat, mirror, steering wheel, pedals, etc., been exceeded?

Is the eye location within the eye ellipse or another favorable viewpoint in the vehicle?

Can the steering wheel always be reached while maintaining a good seat position?

Can the clutch pedal be fully depressed?

Is the thigh supported?

Is the greatest possible essential distance from the steering wheel reachable by the operator?

Are the points of attachment of the safety belt and, thereby, its position within certain limits? and Have additional important limits for the seat position been exceeded?

If the answer to these queries is no, the program returns to the RANDOMLY CONTROLLED GENERATION OF SEAT POSITIONS-PARAMETERS and again generates random values of seat position parameters. These new values are again used to determine a new seat position and again must clear the RESTRICTIONS FULFILLED? step.

Once the restrictions are fulfilled, the individual criteria are multiplied and added, that is, evaluated with factors determined from experience. This evaluation is necessary because normally it is not possible to find a position which yields an optimal value for all angles. The evaluation determines how far each angle may deviate from the optimal value. For instance, the knee angle may deviate 2 degrees and the hip angle 4 degrees.

After the evaluation, the data are stored. Next, a new determination is made with other parameter values supplied by the random generator. The evaluated result of this determination is compared, i.e., the IMPROVEMENT? step, with the stored values to find out whether the new position is better. If the new position is better, the data are stored. After a predetermined number of iterations, the search for the best position is stopped and the best parameters are stored. These values are then checked with regard to practical and logical considerations to see whether they can be accepted. The seat position resulting from these values is then displayed. Finally, the transmitted adjustment values for the seat, mirror, steering wheel, pedals, etc., are printed out and can manually be put into the on-board computer or they can be stored in a small electronic unit and can be read therefrom by the on-board computer.

Generally, the operation of the system will be appreciated by consideration of the following in conjunction with FIGS. 3 and 4. The input/output device, as in other computers, functions to transmit the data to the associated function group, i.e., to transmit the given data into the data memory or to initiate certain computations on the basis of this data and to transmit the calculated output to the comparators I-IV. The comparators compare the actual motor position with the calculated value and, if there is a difference, transmit a signal to the respective motor control which, in turn, drives the respective shifting motor until the difference is zero. The emergency STOP button functions to cause the input/output device to transmit a signal to the motor controls and immediately interrupts any seat adjustment then in progress. The input/output device also functions to transmit the data to the display amplifiers so that the data can be displayed.

Initially, or when a renewed input is necessary, the vehicle data and the personal data are inserted into the computer, namely, twelve items of vehicle data, four items of personal data per person and sixteen factors per person are placed in the computer making a total of ninety-two input values. To insure that the data input takes place in the proper sequence, a servicing guide program is stored in the program memory. This program successively illuminates the keyboard symbols for the data in the order in which it is to be placed in the computer in accordance with the servicing guide program. For example, in the situation S1 (entering and leaving the vehicle), situation S2 (resting position) and situation S3 (lying position), values of D, V, H, and L relate to each of these three positions. It is apparent that these situations are unrelated to the identity of the person and need not be inserted but once for all users. In the initial mode, that is, during the first or a renewed input of the data, the keyboard symbols are successively illuminated on the display as follows:

S1-D, S1-V, S1-H, S1-L;
S2-D, S2-V, S2-H, S2-L;
S3-D, S3-V, S3-H, S3-L.

When the personal data, that is, the data for the individual users, is to be placed into the computer, the keyboard symbol P is illuminated. Then, by pressing one of the keys 1-4, it is determined which of the four persons for which the personal data is to be placed in the computer. It is, of course, apparent that the memory could be provided with sufficient capacity to store information concerning more or less than four persons. Following the input of the person number, i.e., P1, the keyboard D is illuminated at which time the three-digit value for the particular shifting motor key is inserted. Thereafter, the three-digit numbers for the keys V, H, and L are inserted.

After the data for the person P1 has been placed into the computer, the input factors for the personal data for the situations S4 through S7 are commenced. Therefore, the keyboard symbols are successively illuminated on the display and the associated factor is inserted into the computer in the form of a three-digit number following the illumination of F4-D, F4-V, F4-H, F4-L, F5-D, F5-D, F5-V, F5-H, F5-L, F6-D ... F7-L. Thereafter, the keyboard symbol P is again illuminated so that similar data, including the factor data, can be placed in the computer for the next person P2.

By pressing key A and the associated keyboard symbol, the stored data and factors can be displayed. If, for example, a personal data value or an associated factor is to be interrogated, the key P is pressed followed by the number of the person, for example, the key 2, then the associated symbol of the data or the factor is inserted, for example, V or F4-D. If the clear key C is pressed after the appearance of the interrogated value on the display, this value is erased in the computer memory. A new value can then be placed into the computer so that incorrectly inserted values can be corrected and the data for one person can be replaced with that of another.

It is advantageous if the positions of situations S1, S2, and S3 are not specific to a particular person so that these situations may be set without insertion of an identification key in the identification lock 132. For operating the system to set the situations S4 through S7, which are dependent on the identity of the person, the person concerned must insert his identification key into the identification lock 132. By pressing the key S and the situation key, the seat is positioned for each situation, with the exception of situation S7.

In situation S7, the vehicle operator can select the period after which the seat will automatically be adjusted out of situation S4 into the setting according to situation S7 and vice versa. To do so, the operator selects situation S7 by means of the keyboard. The keyboard symbol T is then illuminated and the desired time period is entered with the keyboard in the form of a three-digit number, the first digit being the desired multiple of ten minutes, the second digit the number of minutes and the third digit the desired multiple of ten seconds. The three-digit number 153 would, therefore, correspond to fifteen minutes and thirty seconds. The time period can be set between ten seconds and thirty minutes. Also, if the vehicle seat is in the position for situation S7, after pressing the key T, a new value for the time period can be inserted.

To interrogate and adjust the stored values for D, H, V, and L, the operator presses the desired key and simultaneously presses the plus or minus key if he wishes to set the seat at a position that deviates from the stored value. By pressing the key G and either the plus or minus keys, the adjustments of the seat and seat back inclination are equally increased or decreased. So long as one of the keys and the plus or minus keys are pressed, the corresponding value is changed by one increment each half-second. The increments are two millimeters for D, one millimeter for V, 0.5 millimeters for H and 0.5 millimeters for L. If key G is pressed simultaneously with the plus or minus keys, the values of H and V are adjusted in increments of 0.5 millimeters.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. Apparatus for adjusting the optimal position of a vehicle seat for a person under varying driving conditions comprising:

a vehicle seat;

means for adjusting at least one position of said vehicle seat;

computer means having a memory for vehicle-specific entry parameters and being useful for determining the optimal position of said vehicle seat;

entry means associated with said computer means for entering into said computer personal input data for said person and input data for said driving conditions, said computer means being operable to determine said optimal seat position in response to said input data; and means associated with said computer means for visually displaying optimal seat position data whereby the person is enabled to operate said seat position adjusting means to optimally position said seat.

2. Apparatus according to claim 1, wherein said entry means includes means for entering coded data for said personal input data and said driving condition input data.

3. Apparatus for adjusting the optimal position of a vehicle seat for a person under varying driving conditions comprising:

a vehicle seat;

means for adjusting at least one position of said vehicle seat;

computer means having a memory for vehicle-specific entry parameters and being useful for determining the optimal position of said vehicle seat;

entry means associated with said computer means for entering into said computer personal input data for said person and input data for said driving conditions, said computer means being operable to determine said optimal seat position in response to said input data and to generate output signals corresponding to said optimal seat position; and control means associated with said computer means and responsive to said output signals for controlling said seat adjustment means to thereby position said vehicle seat into the optimal position thereof.

4. Apparatus according to claim 3 including means associated with said computer means for visually displaying optimal seat position data.

5. Apparatus according to claim 3 including a motor operatively connected to said seat adjusting means, said control means including a servomechanism for operating said motor to position said seat to said optimal position thereof.

6. Apparatus according to claim 3 wherein said entry means includes means for entering coded data for said personal input data and said driving condition input data.

* * * * *